Figure 1:
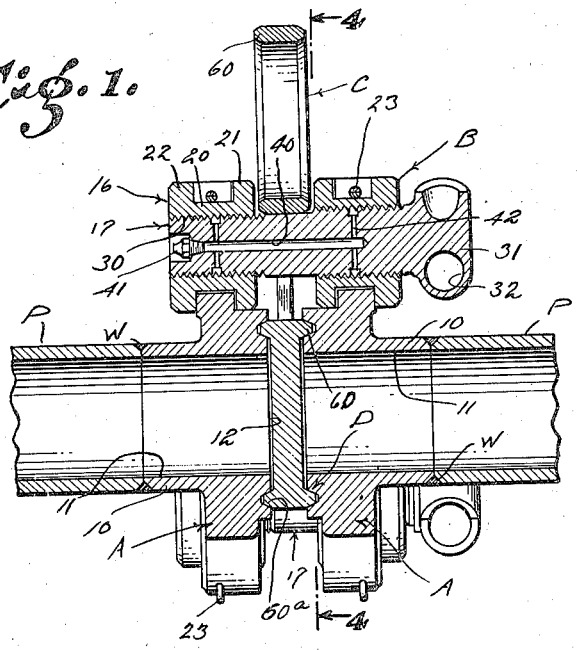

Feb. 22, 1949.　　　　L. S. HAMER　　　　2,462,494
PIPE FITTING

Filed July 19, 1944　　　　　　　　　　2 Sheets-Sheet 1

INVENTOR.
Leland S. Hamer
BY
　　　　Attorney

Feb. 22, 1949.  L. S. HAMER  2,462,494
PIPE FITTING
Filed July 19, 1944  2 Sheets-Sheet 2
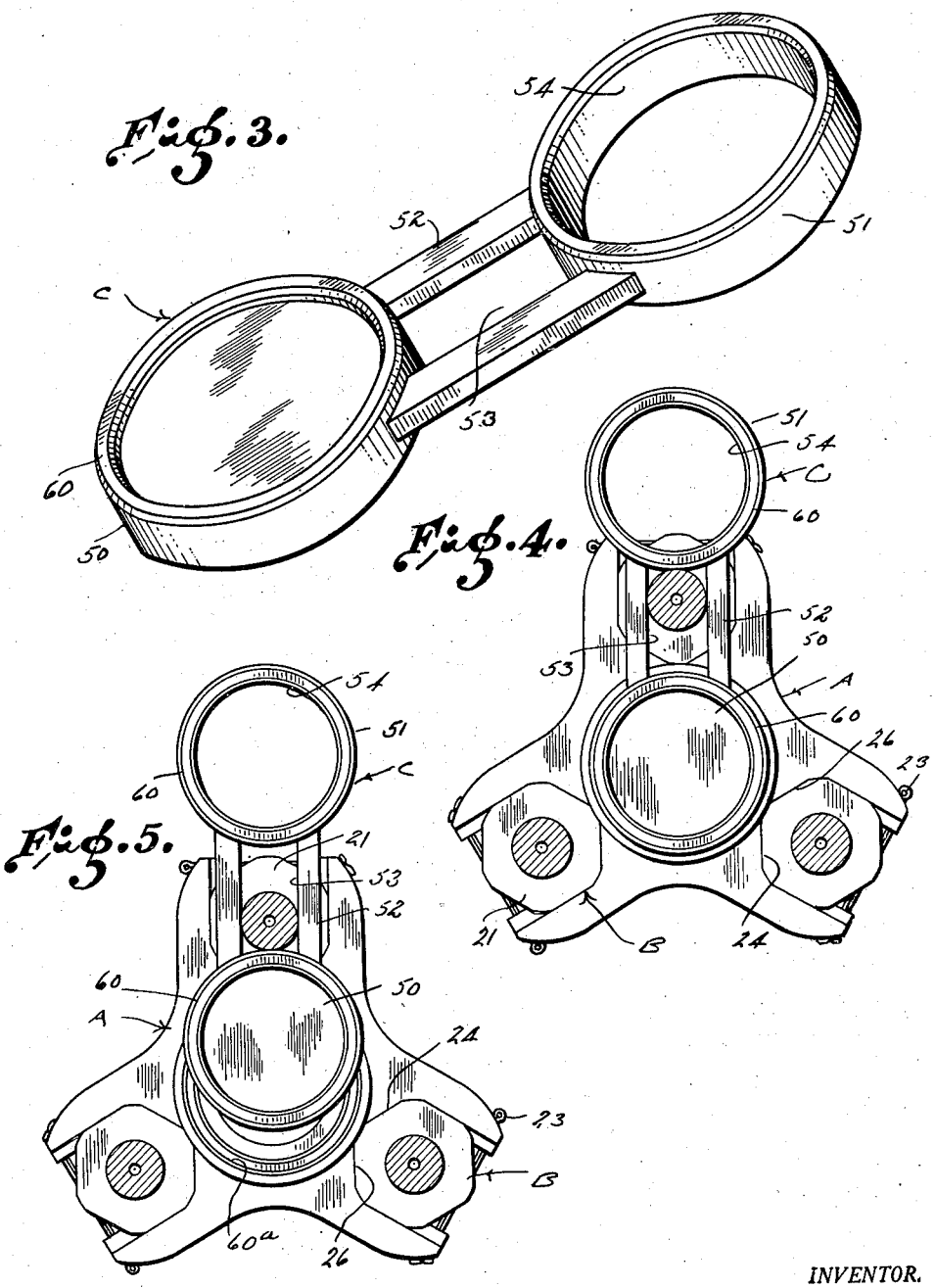
INVENTOR.
Leland S. Hamer
BY
Attorney Patented Feb. 22, 1949

2,462,494

UNITED STATES PATENT OFFICE 2,462,494

PIPE FITTING

Leland S. Hamer, Long Beach, Calif., assignor of one-fourth to Paul A. Dewhirst, Los Angeles, Calif.

Application July 19, 1944, Serial No. 545,605

15 Claims. (Cl. 138—44)

This invention has to do with a pipe fitting; that is, with a device for use in a pipe line, or the like, and it is a general object of the invention to provide improvements in a fitting such as a line blind or orifice fitting, or a combination of the two, and in parts of such a device such as the operating means therefor and the plate element thereof.

It is a general object of my present invention to provide a pipe line fitting involving a plate element which includes plate sections such as an orifice plate or a blinding plate, which plate section can be easily and quickly operated or manipulated to bring either of the plate sections into operating position. A feature of the construction provided by my invention is the manner in which the plate section is coupled with the other parts of the construction so that it can be shifted bodily or endwise and can be swung or rotated to change it end for end.

Another object of my invention is to provide a fitting of the general character referred to wherein a plurality of tie members are spaced around the body sections to hold them together and to operate them, which tie members are located close to the central axis of the structure, thus minimizing the bulk and weight of the construction generally.

Another object of my invention is to provide improvements in the means for coupling and operating the body sections of a fitting such as I have referred to. By my present invention I provide an effective, simple and practical construction by which the body sections of the fitting are joined and can be readily operated so that they are moved either together or apart, as circumstances require.

Another object of my invention is to provide an improved plate section for a fitting of the character described. The plate section that I have provided involves two plate parts which may vary in character as between a blinding plate and an orifice plate, which plate sections are joined by spaced webs to form a rigid unit. The webs which join the plate parts are spaced to form an opening or passage for the reception of a part of the fixture which serves to couple the plate section to the fixture so that it cannot be accidentally dislodged therefrom. Further, the opening established by the spaced webs is of such length as to allow the plate section to be shifted endwise in order to facilitate turning it end for end.

Another object of my present invention is to provide improvements in the construction for sealing plate parts in a fixture of the character described. By my present invention I provide annular grooves in the opposing faces of the body sections and I provide projecting sealing ribs on the faces of the plate parts to have tight seating engagement in the grooves. The construction which I have provided is effective and dependable under severe operating conditions and eliminates entirely the use of packing materials subject to deterioration, failure, or breakdown under heat. It also helps to maintain alignment of the principal parts of the structure.

Figure 2:
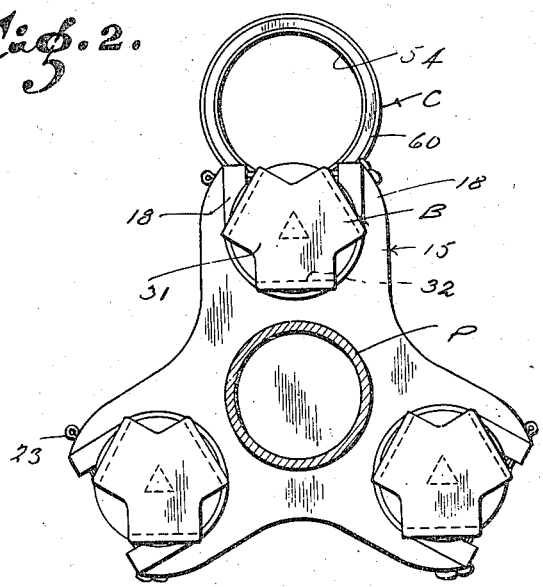

The various objects and features of my invention will be fully understood from the following detailed description of a typical preferred form and application of the invention, throughout which description reference is made to the accompanying drawings, in which:

Fig. 1 is a longitudinal detailed sectional view of a fitting embodying my invention, showing it connected in operating position between opposed pipe sections. Fig. 2 is a transverse sectional view taken from the right of line 4—4 on Fig. 1. Fig. 3 is a perspective view of the plate shown in Fig. 1. Fig. 4 is a detailed transverse sectional view taken substantially as indicated by line 4—4 on Fig. 1, showing the plate section in position where the blind part is in operating position. Fig. 5 is a view similar to Fig. 4 showing the plate section partially operated or, in other words, moved lengthwise to elevate the blind part into a position where the plate is ready to be rotated in the course of turning it end for end.

The device of the present invention involves, generally, opposed body sections A, means for joining and operating the body sections, a plate section C, and sealing means D for establishing tight connections between the plate section and the body sections.

The body sections are annular or sleeve-like members adapted to be applied to the ends of pipe sections P so that they are in opposed relation, as shown in Fig. 1 of the drawings. The outer end portions 10 of the sections A are formed or finished for connection with the pipe sections. When a releasable connection is desired screw threads may be provided whereas if a relatively permanent connection is desired, welding W may be employed as shown in the drawings. Each body section has a straight longitudinal fluid passage 11 formed through it forming a continuation of the opening through the pipe section to which it is joined. The inner end portion of each body section A is preferably somewhat enlarged and is finished to present a flat inner end face 12 of substantial width surrounding the opening 11.

The means B provided for joining and operating the sections A includes a plurality of individual units spaced around the body sections A as clearly shown in Fig. 2. In the preferred form of the invention I provide three such units and space them equally so that they occur 120° apart. Each of the units of the means B is the same and, therefore, I will describe one of them in detail, it being understood that the description is applicable to all.

The means B includes, generally, a yoke-like projection 15 on the exterior of each body section, blocks 16 carried by the projections of the body sections, and a tie member 17 extending between and joined to the blocks.

The two projections of each unit of means B occur opposite each other on the two body sections A and each projects radially from the exterior of its body section. Each projection 15 is made or formed to be yoke-like and opens outwardly or radially, the two side parts 18 being spaced apart and parallel to each other.

The blocks 16 which are applied to the projection 15 are similar, generally, in construction and formation and each is a spool-like member. As shown in the drawings, each block includes a round center portion 20, an inner end flange 21, and an outer end flange 22. The center portion of the block is made or proportioned to fit in the yoke of its supporting projection, or, in other words, is made to fit between the side parts 18 of the projection while the end flanges 21 and 22 overlie the two sides of the projection, as clearly shown in Fig. 1 of the drawings. Through this arrangement the block is supported by the projection against movement endwise or in the direction of the longitudinal axis of the fitting.

My invention provides means for retaining each block in its supporting projection 15 and for holding it against rotation about its axis or in the projection. In the preferred form of the invention I provide a retaining pin 23 to extend between the outer end portion of the sides 18 of the projection to engage over the central portion 20 of the block and thus hold it seated in the yoke. In practice I may use a heavy cotter key for this purpose as I have shown in the drawings. To prevent rotation of the block I provide one of its flanges, preferably its inner flange 21, with a flat side 24 and I provide the body section with one or more shoulders 26 to receive the flat side 24 as shown in Figs. 4 and 5. So long as the side 24 and a shoulder 26 are in engagement the block cannot turn. In the preferred form of the invention I make the periphery of the inner flange 21 polygonal in form so that it presents several flat sides 24, as shown in Figs. 4 and 5, any one of which may be arranged in engagement with the shoulder 26.

The tie member 17 extends between and couples the two blocks, that is, the block supported by one body section with the opposite block supported by the other body section. The tie is preferably a simple, elongate member threaded at each end to cooperate with threaded openings 30 formed centrally in the blocks 16. In accordance with my invention I establish a differential between the threads in the openings 30 of the two blocks, that is, I form the threads in the two blocks so that they are pitched differently. As a result of the differential established between the threads of the two blocks rotation of the tie member 17 causes the blocks to move relative to each other either toward each other or away from each other, depending upon the direction in which the member 17 is rotated.

To facilitate rotation of the tie member 17 I provide a head 31 on one end of it and in the preferred form of the invention I make the head in the form of an enlargement having a plurality of openings 32 suitable for the reception of an operating bar or the like. By providing three equally spaced openings 32 as shown in Fig. 2 the head presents openings that can be readily engaged with a bar when it is desired to rotate the tie member.

In the preferred form of the invention I provide means for lubricating the threads between the tie member and the blocks. I may provide a longitudinal port 40 in the tie member to be supplied with a lubricant from a fitting 41 at one end of the tie member and I may provide lateral distributing ports 42 connecting with the port 40 and extending to the points where the threads are in engagement.

The plate section C of the fitting is an elongate member or structure involving two plate parts, one a blind plate 50 and the other an orifice plate 51. In accordance with my invention the plates 50 and 51 are joined as a unit by spaced webs 52. The webs 52 extend longitudinally of the plate section and connect the two plate parts so that they are spaced a substantial distance apart lengthwise of the plate section. The two webs are spaced apart laterally of the plate section forming a passage 53 to receive the tie member 17 of one of the units of means B. The blind plate part may be a flat solid plate, round in form and proportioned to fit between the finished ends 12 of the body sections A to close the opening through the fitting. The orifice plate 51 may be similar to the blind plate, that is, it may be round in general configuration, except that it has a central opening 54 to register with the openings 11 of the body sections to allow flow through the fitting when it is in place between the end faces 12 of the body sections.

The plate section C of the device is assembled with the other parts above described so that the tie member of one of the units of means B extends through the passage or opening 53 established between the plate parts 50 and 51 by the webs 52. The opening 53 is proportioned as shown in the drawings so that either end of the plate section, that is, either plate part of the plate section, can be lowered or moved inward to a position where it is concentric with the body sections, as shown in Figs. 1 and 4 of the drawings, or can be lifted or moved off center to a position such as is shown in Fig. 5 where it is clear of the tie members of the other units of means B, allowing the plate section to be swung or rotated and consequently manipulated to bring the opposite end between the body sections so it can be lowered into alignment therewith. In other words, the construction that I have provided is such that the plate section, as a unit, can be shifted longitudinally or lengthwise of its axis and can be rotated while tied or coupled to the rest of the fitting by the tie member that extends through its opening 53, and thus can be turned end for end whenever desired without removing any part of the fitting and without having released it from the other parts of the fitting so that it can be separated therefrom.

In carrying out my invention I may provide various means for sealing between the plate parts 50 and 51 and the opposing ends or end faces 12 of the body sections A. In some instances I may provide gaskets for this purpose or sealing rings of various kinds. In accordance with the preferred form of my invention the sealing means D involves annular ribs 60 provided on the faces of the plate parts at the peripheral portions thereof to extend into or cooperate with grooves 60ª provided in the faces 12 of the body sections A, which grooves 60ª are formed concentric with the openings 12. I prefer to form the ribs 60 integral with the plate parts and to shape them so that they are tapered or wedge shaped as shown in the drawings. The grooves 60ª are correspondingly pitched or shaped so that when the body sections A are moved together by operation of the means B the ribs 60 on the plate which is between the body sections are wedged tightly into the grooves in the body sections thus establishing a fluid-tight connection. It will be understood, of course, that the ribs 60 on the two plate parts 50 and 51 are alike in size and shape so that both plate parts may be sealed in like manner.

From the foregoing description it will be apparent that I have provided a construction wherein all of the parts are simple and inexpensive of manufacture. It is to be noted that the two body sections A are alike but are merely arranged oppositely. Likewise it will be noted that the several blocks are alike in general construction. The only difference between the two blocks of each unit of means B is that the threads therein are pitched differently. The tie members 17 employed in the construction are very simple inexpensive members and yet are highly efficient in tying together and in the manner in which they operate the blocks to move the body sections either together or apart. It is also significant that the plate section of the fitting is extremely simple in form and of such character as to be easily manipulated. My invention couples the plate section with the other parts of the fittings so that it can be readily turned end for end without danger of it being separated or dropped, as is the case when the plate is completely released.

It is to be noted that the construction of the present invention is such that the tie member 17 and the two blocks 16 of a unit of means B can be readily detached or removed from the construction whenever desired by simply removing the pins 23, which retain the blocks. From time to time it may be necessary to renew or replace the plate section in which case the member 17 carrying the plate section is removed by detaching the two blocks which are threaded to it. This operation can be performed quickly and easily and does not require manipulation or disturbance of any other parts of the fitting.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. In a fitting of the character described, a body having relatively movable parts with opposed faces, an elongate plate section with spaced parts adapted to be inserted between the said faces, and clamp means slidably pivotally coupling the plate section and the body parts joining them together against separation and allowing lengthwise movement of the plate section and also pivotal movement of the plate section about an axis to position selected parts of the plate section between the faces, the clamp means acting between the body parts clamping them to the plate section.

2. In a fitting of the character described, a body having relatively movable parts with opposed faces, a plate section with spaced parts adapted to be inserted between the said faces, and a single means coupling the plate section and the body parts together joining them against separation and for sliding and pivotal movement of the plate section relative to the body parts to position selected parts of the plate section between the faces and connecting the body parts together and operable to clamp the body parts to the plate section.

3. In a fitting of the character described, a body having relatively movable parts with opposed faces, a plate section with spaced parts adapted to be inserted between the said faces one at a time, and a member holding the body parts together and forming a loose link connection between the body parts and said section whereby the said section is slidably pivotally connected with the body parts, selected parts of the section being movable into position between the faces.

4. In a fitting of the character described, a body having relatively movable parts with opposed faces, a plate section with spaced parts adapted to be inserted between the said faces one at a time, and a member coupling the body parts against separation and connecting the body parts and said section whereby said section can be slidably pivotally moved relative to the body parts so selected parts of the section can be moved into and out of position between the faces, said connection including a member attached to the body parts and extending through an elongate opening in the said section.

5. A fitting of the character described including, two opposed body sections and means connecting the sections including a block attached to each section to be removable therefrom and a tie member extending between and threaded to each block.

6. A fitting of the character described including, two opposed body sections and means connecting the sections including a block releasably held by each section and a tie member extending between and threaded to each block, the threads of the blocks being pitched differently.

7. A fitting of the character described including, two opposed body sections and means connecting the sections including projections on the sections, a block detachably connected to each projection, means holding the block against rotation and a tie member extending between the blocks and threaded to both of the blocks.

8. A fitting of the character described including, two opposed body sections and means connecting the sections including yoke projections on the sections, a block carried in each projection, and a tie member extending between and threaded to both of the blocks.

9. A fitting of the character described including, two opposed body sections and means connecting the sections including yoke projections on the sections, a block carried in each projection, means retaining the blocks in the projections against rotation, and a tie member extending between and threaded to both of the blocks.

10. A fitting of the character described including relatively annular body sections with opposed faces around the openings through the sections, a plurality of circumferentially spaced tie members coupling the body sections, there being annular grooves in the faces of the body sections, a plate insertable between adjacent tie members to working position between the faces, and ribs on the plate seating in the grooves establishing a seal between the body sections and plate.

11. An elongate tubular fitting of the character described including axially spaced relatively movable annular body sections with opposed faces of the sections around the openings through the sections, a plurality of circumferentially spaced tie members coupling the body sections there being annular grooves in the faces of the sections, a plate to be inserted between the faces, and ribs on the plate seating in the grooves, the grooves and ribs having pitched faces fitting tight together establishing a seal between the body sections and plate.

12. A fitting of the character described including flow handling body sections with annular opposed faces, one of the sections having a groove in its face, a plate to be arranged between said sections, and a rib on one side of the plate seating in the groove establishing a seal between the body sections and plate.

13. In a flow handling fitting, opposed body sections, tie bolts joining the sections and located substantially one hundred and twenty degrees apart around the sections, and a plate slidably pivotally carried by one of the bolts and having a part operable into and out of position between the sections.

14. In a flow handling fitting, opposed body sections, tie bolts joining the sections and located substantially one hundred and twenty degrees apart around the sections, and a plate slidably pivotally carried by one of the bolts and having ends to be arranged between the sections and having a middle part connecting the ends and carried by said bolt.

15. In a flow handling fitting, two sections with opposed annular faces, an elongate plate having ends insertable between the faces, and means clamping the sections together including two tie bolts extending between the sections radially outward of the faces and circumferentially spaced around the faces to pass the plate ends between them, the plate being slidably pivotally engaged by only one of said bolts coupling the plate to the body sections for longtiudinal and pivotal movement relative to the body sections to pass either end of the plate between said bolts and position it between or remove it from between said faces.

LELAND S. HAMER.

REFERENCES CITED

The following references are of record in the file of this patent:

UNITED STATES PATENTS

| Number | Name | Date |
| --- | --- | --- |
| 213,142 | Strater et al. | Mar. 11, 1879 |
| 540,270 | Parker | June 4, 1895 |
| 639,198 | McDonald | Dec. 12, 1899 |
| 1,287,273 | Fisher | Dec. 10, 1918 |
| 1,575,259 | Fisher | Mar. 2, 1926 |
| 1,631,264 | Haldeman | June 7, 1927 |
| 1,633,161 | Cavenagh | June 21, 1927 |
| 1,780,828 | Leach et al. | Nov. 4, 1930 |
| 1,865,795 | Schnitter | July 5, 1932 |
| 2,013,212 | Hollander et al. | Sept. 3, 1935 |
| 2,214,959 | Hamer | Sept. 17, 1940 |
| 2,242,467 | Hamer | May 20, 1941 |
| 2,271,138 | Hamer | Jan. 27, 1942 |
| 2,309,304 | Creighton | Jan. 26, 1943 |
| 2,362,454 | Damsel | Nov. 14, 1944 |

FOREIGN PATENTS

| Number | Country | Date |
| --- | --- | --- |
| 24,017 | Great Britain | Nov. 21, 1905 |
| 29,598 | Great Britain | Dec. 31, 1904 |